Figure 1:
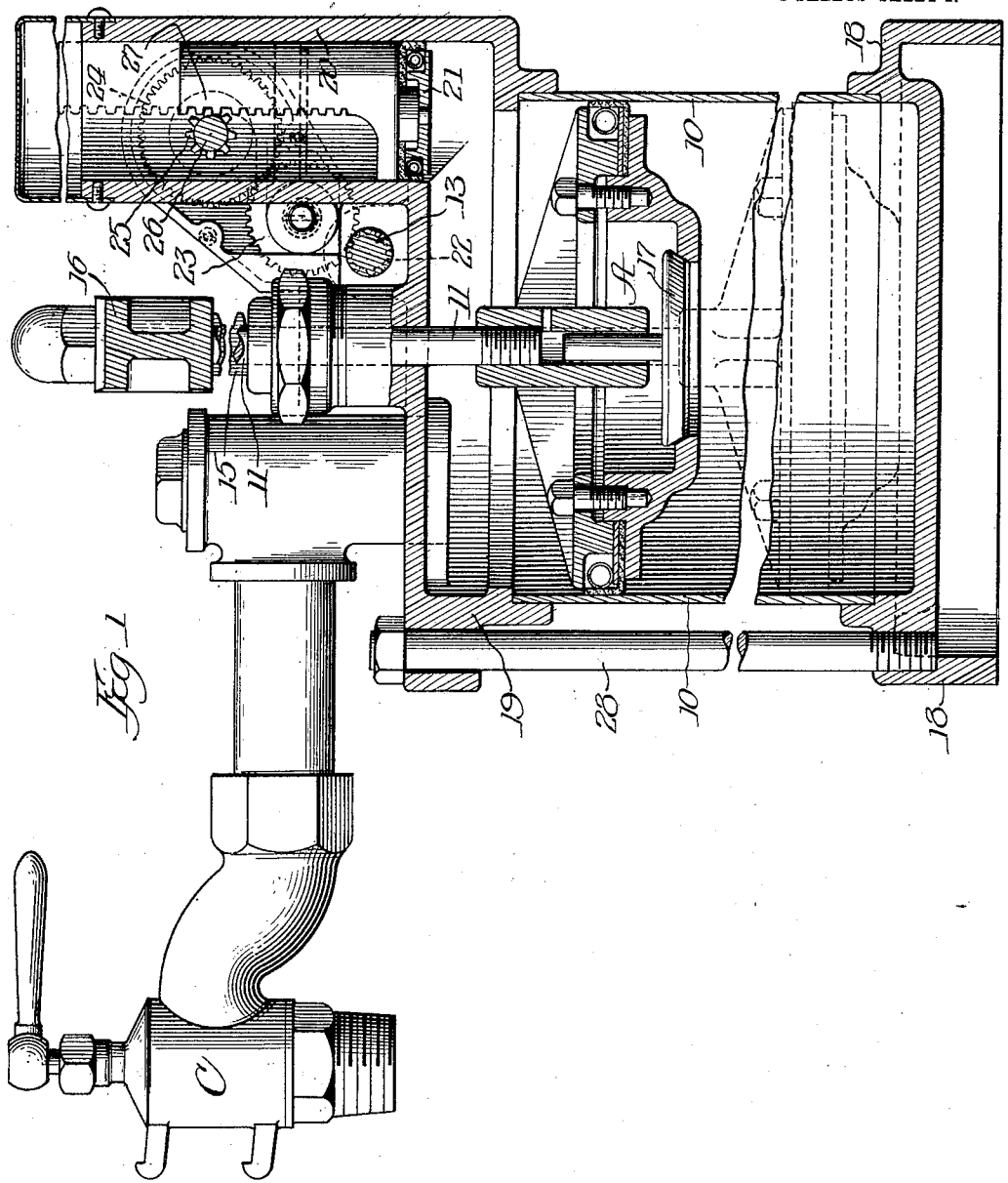

A. A. BOWSER.
PUMP.
APPLICATION FILED JULY 30, 1913.

1,102,468.

Patented July 7, 1914.

2 SHEETS—SHEET 1.

Witnesses:

Inventor:
Allen A. Bowser
By Brown, Hopkins, Nissen & Sprinkle
Attys.

THE NORRIS PETERS CO., PHOTO-LITHO., WASHINGTON, D. C.

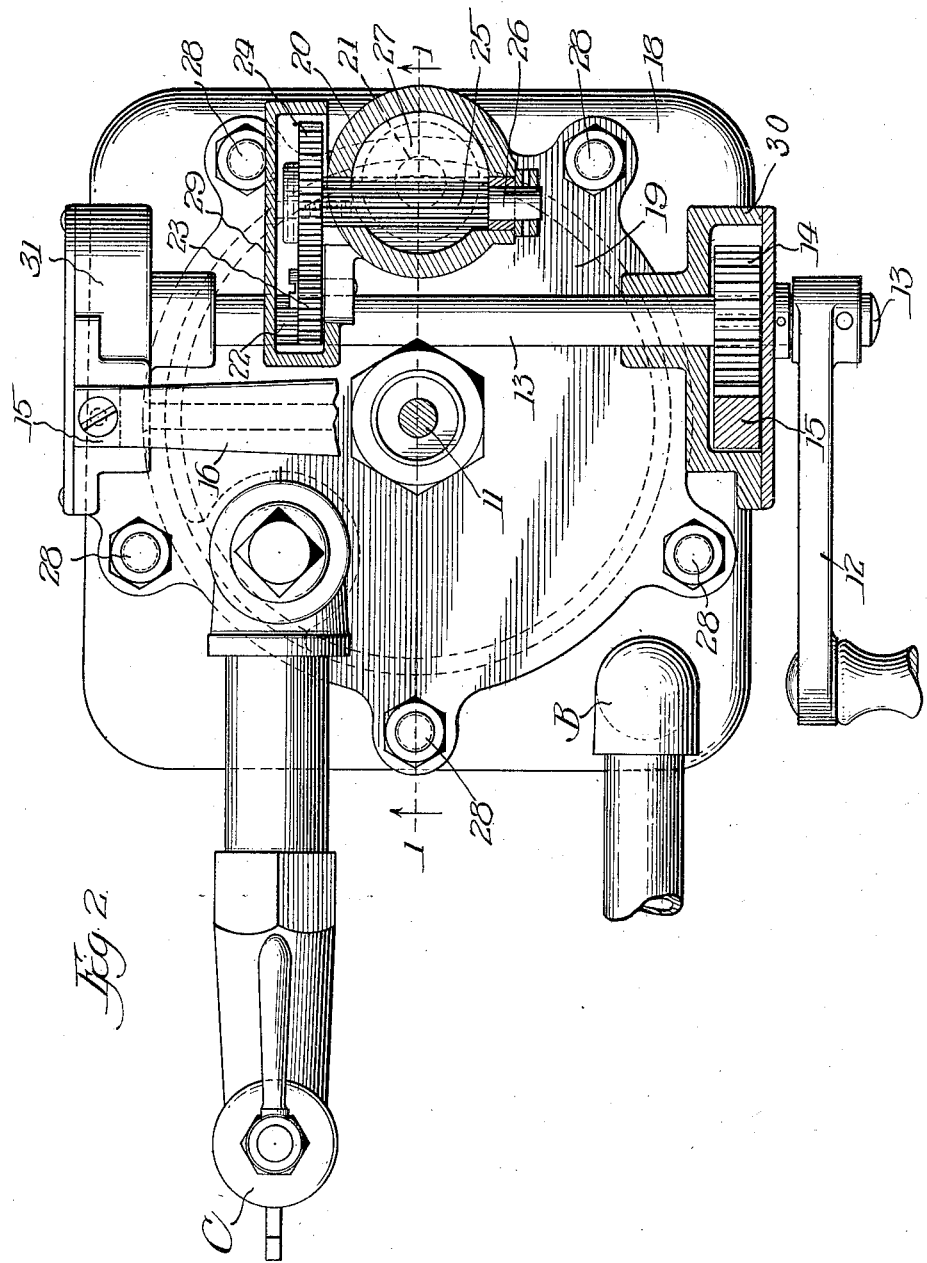

UNITED STATES PATENT OFFICE.

ALLEN A. BOWSER, OF FORT WAYNE, INDIANA.

PUMP.

1,102,468. Specification of Letters Patent. Patented July 7, 1914.

Application filed July 30, 1913. Serial No. 782,134.

*To all whom it may concern:*

Be it known that I, ALLEN A. BOWSER, a citizen of the United States, residing at Fort Wayne, in the county of Allen and State of Indiana, have invented certain new and useful Improvements in Pumps, of which the following is a specification.

My invention relates to pumps, and has for its primary object the provision of an improved pump which shall have improved means for pumping sufficient fluid to compensate for that displaced by parts inserted within or drawn from the pumping chamber during operation.

With the above and other objects in view, this invention consists substantially in the combination, construction, and arrangement of parts, all as hereinafter described, illustrated in the accompanying drawings which form a part of this specification and show the preferred embodiment of my invention, and more particularly set forth in the subjoined claims.

In the drawings: Figure 1 is a vertical section of a pump constructed in accordance with the principles of my invention, the section being taken approximately on the line 1—1 of Fig. 2, looking in the direction indicated by the arrows. Fig. 2 is a top plan view of the same pump with some parts broken away and other parts in section.

Reference numeral 10 indicates the barrel of a pump in which is reciprocated a valved main piston generally indicated by A. The main piston is driven by a piston rod 11 passing through the upper casing of the pump, the piston rod receiving its power from a handled crank 12, a power shaft 13 driven thereby, pinions 14 upon the power shaft, racks 15 in mesh with the pinions 14, and a yoke 16 to which the outer end of the piston rod is attached. The intake for liquid is indicated generally by B and the discharge therefor by C. The main piston A is provided with an upwardly opening check valve 17.

The bottom casing of the pump is indicated by reference numeral 18, and the upper casing by 19. Formed upon the upper casing 19 is an auxiliary piston casing 20 having direct liquid communication with the interior of the pump barrel 10. Within the auxiliary piston casing 20 a solid auxiliary piston 21 is mounted for reciprocation. Secured to the piston 21 is a semicylindrical rack 27 which preferably occupies and fits within one-half of the cross sectional area of the auxiliary piston casing 20. Power is transmitted to the auxiliary piston 21 from the power shaft 13 by means of teeth 22 formed upon the power shaft, a train of gears 23 and 24 in mesh therewith, a driving shaft 26 rotated by the gear 24, and a pinion 25 upon the driving shaft meshing with the rack 27. Suitable tie rods 28 hold the casings 18 and 19 in proper position upon the ends of the pump barrel 10, and the gears which operate the auxiliary piston 21 are covered with a guard casing 29; also the pinions 14 upon the power shaft 13 are covered with guard casings 30 and 31.

In dotted lines in Fig. 1 is shown the position of the main piston A when at the bottom of its stroke, while in full lines in Fig. 1 is shown the same piston at the upper end of its stroke. In dotted lines in Fig. 1 is shown the position of the auxiliary piston 21 when at the top of its stroke, and in full lines in Fig. 1 is shown the position of the same piston when at the bottom of its stroke. The main piston A and the auxiliary piston 21 move simultaneously in opposite directions, each completing its stroke synchronously with the other. The main piston A, in the operation of the pump, lifts a body of fluid in the barrel 10 during its upward stroke, the fluid discharging through the fluid outlet C. Upon the return stroke of the main piston A the valve 17 opens, allowing the piston to descend through the fluid filled barrel 10 to the bottom of the barrel, when, upon the upward reciprocation of the main piston the valve 17 closes and the rise of the piston again causes discharge of fluid from the outlet C. It will be noted that, if the pump were not provided with an auxiliary piston, but were merely the ordinary type of piston pump, the piston rod 11, as it entered the barrel 10 during the downward stroke of the main piston A, would displace its own volume of fluid, forcing from the discharge C the amount of fluid displaced.

It is to be understood that any suitable means are provided for allowing the influx of fluid through the intake B to the pump chamber and for preventing the efflux of fluid therethrough. If the pump were not provided with the auxiliary piston 21 it is obvious that a full upward and downward stroke of the piston A would be necessary to accomplish the discharge through the outlet C of the full capacity of the pump, for when the piston A is at the bottom of its stroke a volume of liquid equal to the volume of the piston rod 11 is displaced by the piston and is consequently not above the piston in position to be discharged through the outlet; hence the amount of fluid discharged during the upward stroke of the piston A is the full capacity of the pump minus the amount displaced by the piston rod 11. To cause a discharge from the outlet C of the full capacity of the pump the piston rod 11 must be re-inserted in the pump in order that it may displace its own volume of liquid.

My invention is particularly useful where exact amounts of liquid are to be pumped, inasmuch as it provides that in each delivery of the pump, that is, at each upward stroke of the main piston A, the full capacity of the pump is discharged. A further advantage of my invention is that during the return or downward stroke of the main piston A there is no drip or discharge from the outlet C. These advantages are secured in operation by the action of the auxiliary piston 21 which, through the medium of the direct meshing rack and gear mechanism above described, is actuated oppositely with relation to the main piston A, and during the upward stroke of the main piston A operates downwardly to force delivery from the outlet C of the full capacity of the pump, and during the downward stroke of the main piston A works upwardly to draw into the piston through the valve 17 an amount of liquid to compensate for that displaced by the entrance of the piston rod 11 into the barrel of the pump.

In the accompanying drawings and in the foregoing description is set forth the preferred embodiment of my invention, but it is obvious that one skilled in the art may make modifications thereof without departing from the spirit of the invention.

I claim:

1. A single acting piston pump having a valved piston, and means for increasing the normal fluid discharge thereof by an amount of fluid which shall compensate for that displaced by the insertion of parts within the pump.

2. The combination with a piston pump having a piston rod which enters and recedes from the pump during its operation, of a driving shaft, pinions upon the driving shaft, racks secured to the piston rod, said racks and pinions being in mesh to reciprocate the piston, an auxiliary casing communicating with the pump chamber, an auxiliary piston within the auxiliary casing, and means actuated by the driving shaft for reciprocating the piston and auxiliary piston synchronously in opposite directions.

3. The combination with a piston pump of an auxiliary piston casing communicating with the pump chamber, an auxiliary piston within the auxiliary casing, a rack secured to the auxiliary piston, and means for reciprocating the rack and piston.

4. The combination with a piston pump of an auxiliary piston casing communicating with the pump chamber, an auxiliary piston within the auxiliary casing, a rack secured to the auxiliary piston and guided by the inner wall of the casing, and means for reciprocating the rack and piston.

5. The combination with a piston pump having a driving shaft, of an auxiliary piston casing communicating with the pump chamber, an auxiliary piston within the auxiliary casing, a rack secured to the auxiliary piston, and means for reciprocating the rack and piston, comprising a train of gears communicating with the driving shaft of the pump and with the rack.

6. The combination with a piston pump, of an auxiliary casing communicating with the pump chamber, an auxiliary piston within the auxiliary casing, a driving shaft, pinions upon the driving shaft, a rack upon the auxiliary piston, a rack upon the pump piston, said pump piston rack meshing with one of the driving shaft pinions, and a train of gears communicating the power of the driving shaft through one of its pinions to the rack of the auxiliary piston.

7. A single acting piston pump combining a valve within the piston open during the intake stroke of the piston and closed during the discharge stroke, an auxiliary casing communicating with the discharge end of the pump chamber, and an auxiliary piston within the auxiliary casing reciprocated synchronously with the pump piston and in the opposite direction.

In testimony whereof I have signed my name to this specification, in the presence of two subscribing witnesses, on this 25 day of July, A. D. 1913.

ALLEN A. BOWSER.

Witnesses:
J. R. MATLACK,
S. W. THOMAS.